United States Patent
Cheung et al.

(10) Patent No.: US 7,426,304 B2
(45) Date of Patent: Sep. 16, 2008

(54) METHOD AND DEVICE FOR THREE-DIMENSIONAL GRAPHICS TO TWO-DIMENSIONAL VIDEO ENCODING

(75) Inventors: Gene Cheung, Musashino (JP); Takashi Sakamoto, Tokyo (JP); Wai-tian Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 913 days.

(21) Appl. No.: 10/942,357

(22) Filed: Sep. 15, 2004

(65) Prior Publication Data

US 2006/0056717 A1 Mar. 16, 2006

(51) Int. Cl.
*G06K 9/36* (2006.01)
(52) U.S. Cl. .................. 382/232; 382/236; 382/285
(58) Field of Classification Search ............... 382/232, 382/285, 236; 345/420, 505, 555, 589, 629; 375/240.15; 349/77
See application file for complete search history.

(56) References Cited

U.S. PATENT DOCUMENTS

| 5,745,197 | A * | 4/1998 | Leung et al. .............. 349/77 |
| 6,636,222 | B1 * | 10/2003 | Valmiki et al. ............ 345/505 |
| 6,768,774 | B1 * | 7/2004 | MacInnis et al. ....... 375/240.15 |
| 6,853,385 | B1 * | 2/2005 | MacInnis et al. .......... 345/629 |
| 6,975,324 | B1 * | 12/2005 | Valmiki et al. ............ 345/555 |
| 7,031,554 | B2 * | 4/2006 | Iwane ..................... 382/305 |
| 7,145,562 | B2 * | 12/2006 | Schechter et al. .......... 345/420 |
| 7,277,099 | B2 * | 10/2007 | Valmiki et al. ............ 345/589 |

* cited by examiner

*Primary Examiner*—Anh Hong Do (57) ABSTRACT

A method and device for three-dimensional graphics to two-dimensional video encoding. A three-dimensional model representing at least one three-dimensional object is received. The three-dimensional model is rendered into a two-dimensional frame. Composition information for the two-dimensional frame is extracted from the three-dimensional model. A bit stream is encoded based on the two-dimensional frame and the composition information.

40 Claims, 5 Drawing Sheets

```
┌─────────────────────────────────────────────┐
│ Receive a three-dimensional model representing │
│     at least one three-dimensional object     │
│                     310                        │
└─────────────────────────────────────────────┘
                      ↓
┌─────────────────────────────────────────────┐
│  Rendering the three-dimensional model into a  │
│            two-dimensional frame               │
│                     320                        │
└─────────────────────────────────────────────┘
                      ↓
┌─────────────────────────────────────────────┐
│  Extracting composition information for the    │
│       two-dimensional frame from the           │
│            three-dimensional model             │
│                     330                        │
└─────────────────────────────────────────────┘
                      ↓
┌─────────────────────────────────────────────┐
│   Generating a weighting factor based on the   │
│            composition information             │
│                     340                        │
└─────────────────────────────────────────────┘
                      ↓
┌─────────────────────────────────────────────┐
│        Encode a bit stream based on the        │
│  two-dimensional frame and the weighting factor│
│                     350                        │
└─────────────────────────────────────────────┘
```

Determine a mean depth value for a macroblock based on depth values for pixels of the macroblock
410

Determine a variance depth value for the macroblock based on depth values for pixels of the macroblock
420

Generate the weighting factor for the macroblock based on the mean depth value and the variance depth value
430

METHOD AND DEVICE FOR THREE-DIMENSIONAL GRAPHICS TO TWO-DIMENSIONAL VIDEO ENCODING

TECHNICAL FIELD

Embodiments of the present invention relate to the field of video encoding.

BACKGROUND ART

A wide array of mobile clients, such as personal digital assistants (PDAs) and cellular telephones, include display screen for displaying streaming video content. With the expanded bandwidth of wireless networks (e.g., 3G wireless networks), it was believed that streaming video would occupy the vast majority of wireless media. However, the fastest-growing applications have instead been in the arena of mobile network games based on three-dimensional (3D) graphics models. For instance, in countries such as Korea and Japan, the use of mobile network games has increased such that there is a substantial desire to access mobile network games using mobile electronic devices.

Mobile network games require real-time interactivity, placing a stringent demand of volume timely deliverable data on the current 3G wireless network real-time mechanism. Moreover, typical mobile clients are low-powered lightweight devices having limited computing resources and without the ability to render the millions of triangles per second typically necessary for high quality graphics. As a result, current mobile online games are typically limited in group size and interaction, and are simplistic in visual quality.

In order to improve the quality of mobile online games, a fundamental advance in wireless network technology and a drastic speedup in mobile computing hardware is required. However, game observers comprise a large and growing set of mobile client users. Game observers are users that access network games as non-participants who are interested only in viewing the action. These network games are not limited to mobile network games. For instance, game observers might access a network game from their home personal computers that hardware sufficient to render 3D graphics. As network games mature, highly skilled players acquire fan bases that loyally follow and observe their heroes in action en masse in multicast channels.

Currently, mobile network game observers are subject to the same limitations as active game participants. Specifically, in order to observe a network game, the observer's mobile client typically must meet the hardware requirements necessary to display 3D graphics. However, as describe above, typical mobile clients do not include hardware capable of rendering 3D graphics. Accordingly, mobile game observers are limited to viewing mobile online games, which are often less compelling and have simplistic graphics, and therefore less desirable to observe.

DISCLOSURE OF THE INVENTION

Various embodiments of the present invention, a method and device for three-dimensional graphics to two-dimensional video encoding, are described herein. In one embodiment, a three-dimensional model representing at least one three-dimensional object is received. The three-dimensional model is rendered into a two-dimensional frame. Composition information for the two-dimensional frame is extracted from the three-dimensional model. A bit stream is encoded based on the two-dimensional frame the composition information.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be implemented in a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
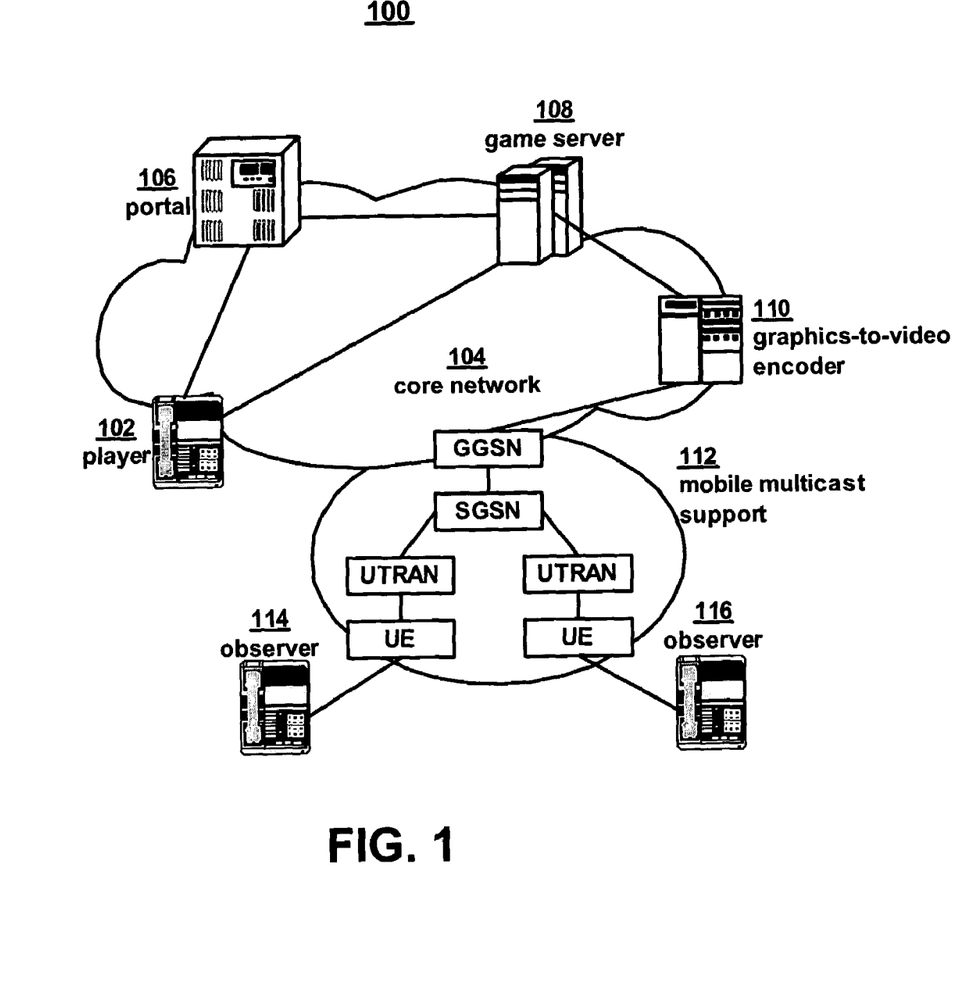
FIG. 1 illustrates a block diagram of a game observer video encoding and mobile network, in accordance with an embodiment of the present invention.

FIG. 1 illustrates a block diagram of a game observer video encoding and mobile network 100 (hereinafter referred to as network 100), in accordance with an embodiment of the present invention. Network 100 includes core network 104 and mobile multicast support 112. Core network 104 includes game player 102, portal 106, game server 108 and graphics-to-video encoder 110. Game player 102 may be connected to core network 104 using either a wired or wireless connection. In one embodiment, game player acquires permission and registers for an online game via portal 106. Game player 102 then participates in the game in a server-client model via game server 108. Game server 108 is operable to provide three-dimensional (3D) game play (e.g., games using 3D models) to game player 102. Game server 108 sends updated game events to game player 102 as well as graphics-to-video encoder 110. It should be appreciated that any number of game players 102 may access core network 104.

Graphics-to-video encoder 110, also referred to as a grencoder, is a computer system for converting updated game events to an encoded bit stream. In one embodiment, the bit stream is streamed to interested game observers 114 and 116 using mobile multicast support 112. However, it should be appreciated that any method or technique for transmitting wireless transmission of data may be used. In one embodiment, mobile multicast support 112 utilizes the 3G wireless standard, and includes a Gateway GPRS (General Packet Radio Service) Support Node (GGSN), a Serving GPRS Support Node (SGSN), a plurality of UMTS (Universal Mobile Technology System) Terrestrial Radio Access Network (UTRAN) nodes, and a plurality of user equipment (UE) for transmitting the bit stream to observer 114 and observer 116. However, it should be appreciated that any wireless standard may be used. In one embodiment, the user equipment is a mobile client. In one embodiment, the mobile client is a personal digital assistant. In another embodiment, the mobile client is a cellular telephone.

Figure 2:
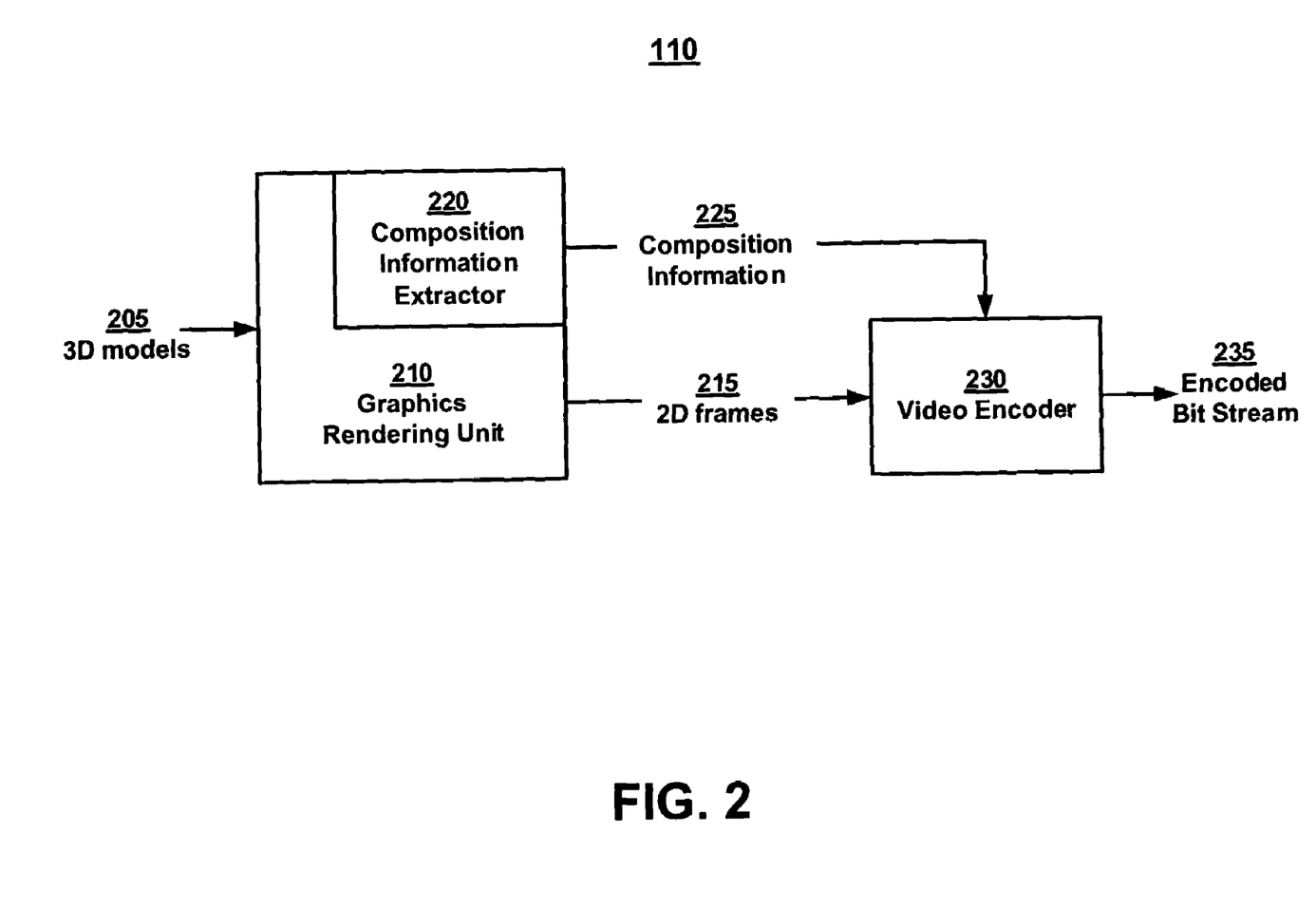
FIG. 2 illustrates a block diagram of a graphics-to-video encoder, in accordance with an embodiment of the present invention.

FIG. 2 illustrates a block diagram of grencoder 110, in accordance with an embodiment of the present invention. Grencoder 110 includes graphics rendering unit 210, composition information extractor 220, and video encoder 230. In one embodiment, grencoder 110 is operable to perform a process for three-dimensional graphics to two-dimensional video encoding.

Graphics rendering unit 210 receives a 3D model from a server (e.g., game server 108 of FIG. 1). Graphics rendering unit 210 renders a 3D representation of objects of the 3D model onto a 2D plane, generating raw two-dimensional (2D) frames (215). The rendering is also referred to as rasterization. In one embodiment, this is performed in a frame buffer of graphics rendering unit 210.

Composition information extractor 220 is operable to extract composition information 225 from the 3D model to improve the visual quality of encoded bit stream 235. By accessing the original 3D model 205 that produce the 2D frames 215, graphics rendering unit 210 has access to scene composition information of the encoding source. This composition information is typically available to a video encoder. In one embodiment, the composition information includes depth values of object of 3D model 205. Depth values of objects are used for discerning which object is closer to the camera, and hence which objects are occluded and which are not. By assuming that objects closer to a camera are also objects of interest, then depth values also reveal regions of interest. It should be appreciated that the composition information may include other factors, including but not limited to: motion, texture, shape, fog, lighting, and other semantic information. In one embodiment, composition information extractor 220 transmits composition information 225 to video encoder 230 to improve the visual quality of regions of interest. In another embodiment, composition information extractor 220 generates a weighting factor based on the composition information 225 for identifying a region of interest. The weighting factor is then transmitted to video encoder 230 to improve the visual quality of regions of interest.

Video encoder 230 receives 2D frames 215 and composition information 225 for generating encoded bit stream 235. Composition information 225 is used for identifying regions of interest of 2D frames 215. Video encoder 230 is configured to apply a mode election strategy to allocate more bits to the regions of interests, thus improving visual quality of encoded bit stream 235. The bit stream is subsequently packetized and sent to the interested observers (e.g., game observers 114 and 116 of FIG. 1). It should be appreciated that video encoder 230 may be any standard compliant video encoder, such as a Moving Pictures Experts Group (MPEG) video encoder.

Figure 3:
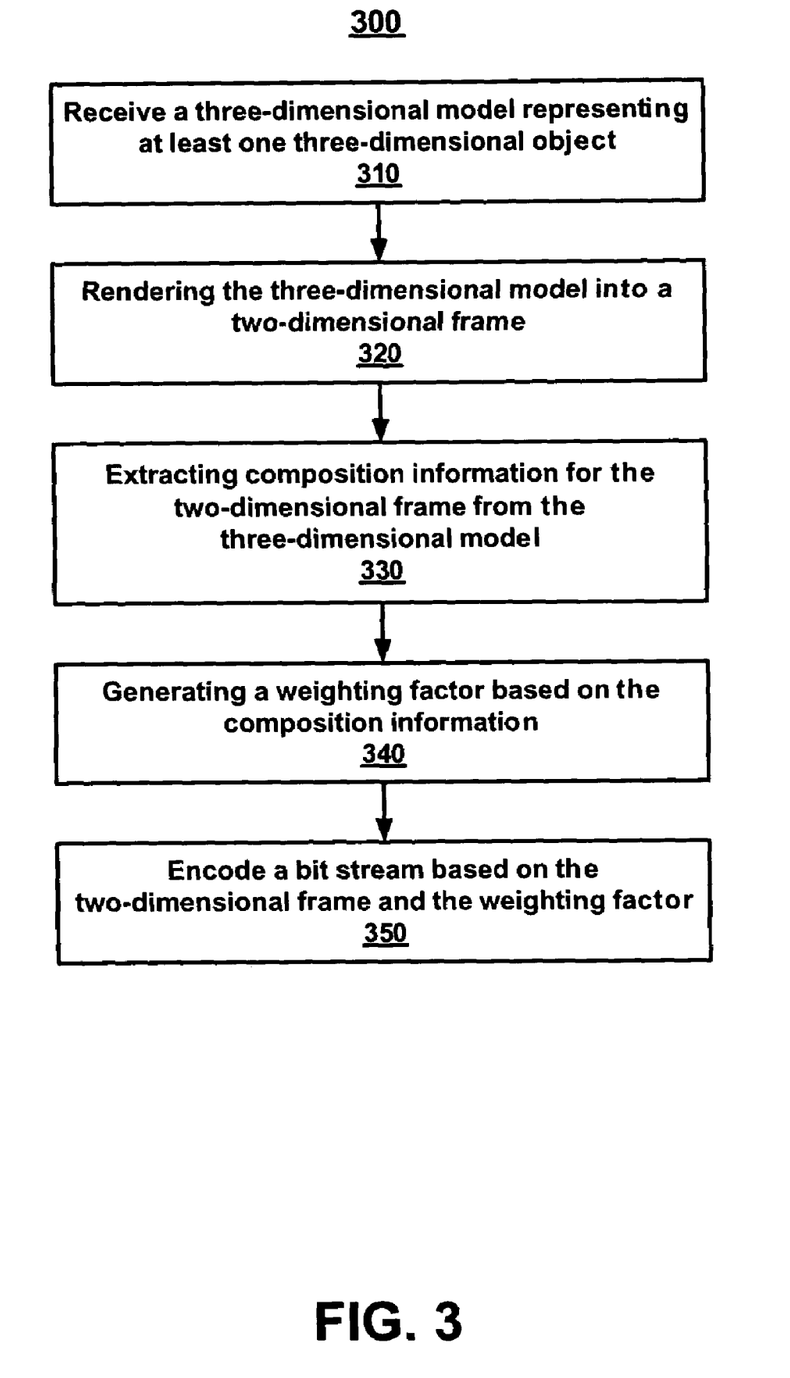
FIG. 3 illustrates a flow chart of a process for three-dimensional graphics to two-dimensional video encoding, in accordance with an embodiment of the present invention.

FIG. 3 illustrates a flow chart of a process 300 for three-dimensional graphics to two-dimensional video encoding, in accordance with an embodiment of the present invention. In one embodiment, process 300 is carried out by processors and electrical components (e.g., a computer system) under the control of computer readable and computer executable instructions, such as grencoder 110 of FIGS. 1 and 2. Although specific steps are disclosed in process 300, such steps are exemplary. That is, the embodiments of the present invention are well suited to performing various other steps or variations of the steps recited in FIG. 3.

At step 310, a 3D model representing at least one 3D object is received. In one embodiment, the 3D model is received from a server (e.g., game server 108 of FIG. 1). In one embodiment, the 3D model is compliant with OpenGL. OpenGL is an industrial standard for graphics initiated by Silicon Graphics Inc., that provide a set of application programming interfaces (APIs) that enables graphics programmers to write software that can be easily compiled and optimized on a wide variety of computing platforms. In another embodiment, the 3D model is compliant with OpenGL embedded system (ES), a subset of OpenGL APIs deemed essential for mobile network gaming. Using an OpenGL ES rather than the full-size OpenGL lightens the burden of the hardware manufacturers to support a graphics specification, while enabling them to specialize in fewer APIs.

At step 320, the 3D model is rendered into a 2D frame. In one embodiment, any standard rasterization may be used to render the 2D frame. In one embodiment, a 2D frame has width and height that are multiples of 16 that are required by certain MPEG encoders.

At step 330, composition information for the 2D frame is extracted from the 3D model. In one embodiment, the composition information includes depth information indicating depth values for pixels of the 2D frame. It should be appreciated that the composition information include, but it not limited to: motion information (e.g., motion vectors), texture information, object shape information, lighting information, fog information, and other semantic information. It should be appreciated that step 330 can be performed before or after step 320.

In one embodiment, where depth information is extracted, during rasterization when 3D objects are mapped to 2D plane, a depth value for each pixel mapped may be calculated using a Z-buffer algorithm to determine object occlusion. Assuming 3D objects are expressed in OpenGL ES APIs, API wrappers are written for particular OpenGL ES APIs after rasterization to first extract depth value d(j, k) for each pixel (j, k) from the frame buffer before calling the native APIs. Accordingly, embodiments of the invention may can be easily adopted by any mobile network game developers that support OpenGL ES, and game developers do not need to make any alterations to their game software in order to reveal depth values for grencoding.

At step 340, a weighting factor is generated based on the composition information. In one embodiment, the weighting factor is generated for at least one macroblock of a 2D frame. The weighting factor is used to assist in bit allocation during video encoding. For example, weighting factors may be generated for all macroblocks of a 2D frame. Macroblocks with a greater weighting factor are indicated as regions of interest (e.g., are more important than other macroblocks). For instance, in a 2D frame representing an image of a person, macroblocks with high weighting factors may represent the person (e.g., the foreground), while macroblocks with lower weighting factors may represent the background. During video encoding, a greater percentage of bits may be allocated to macroblocks representing the person than to macroblocks representing the background, thereby improving the apparent resolution of the 2D frame using the same number of bits.

Figure 4:
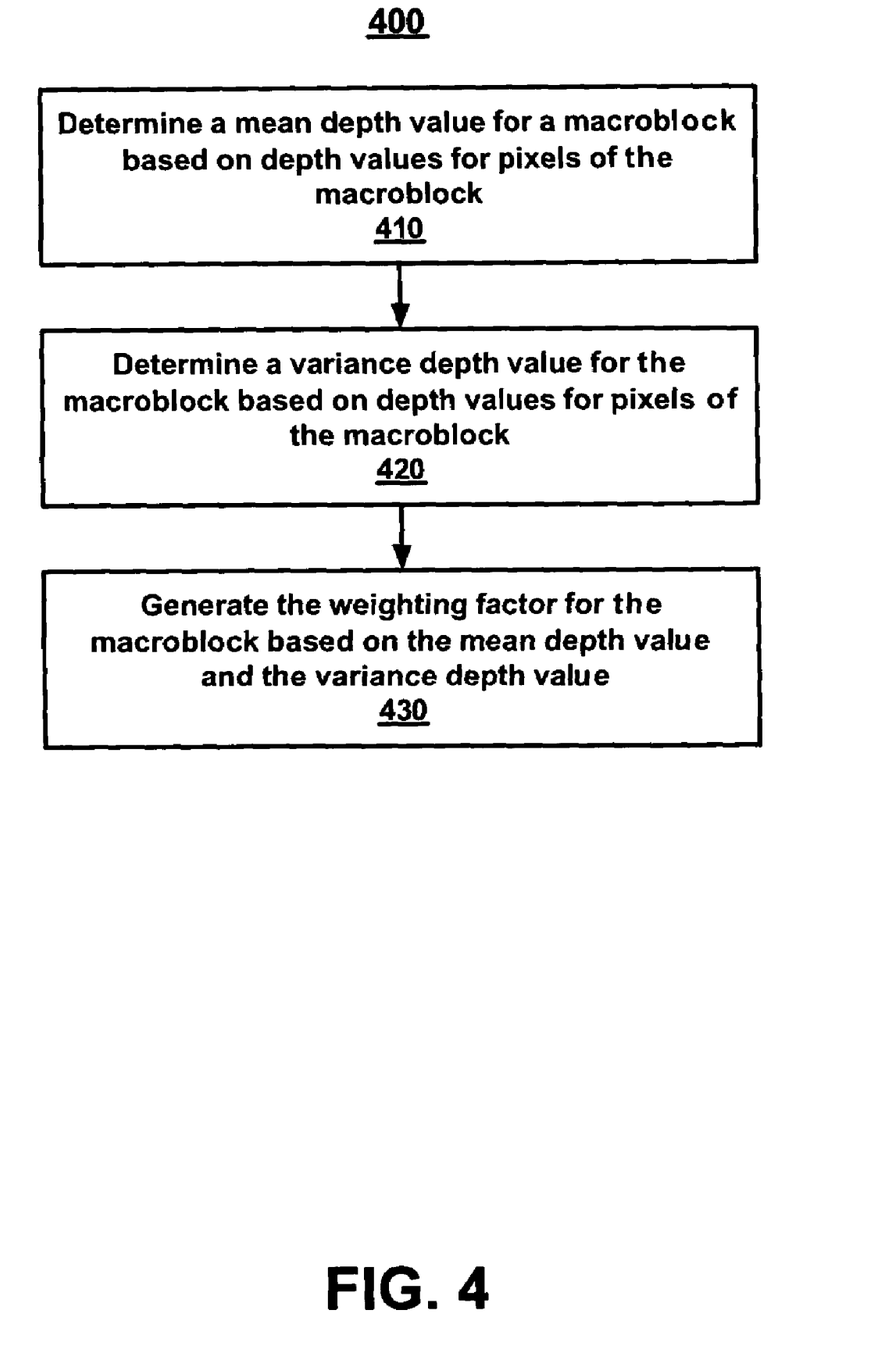
FIG. 4 illustrates a flow chart of a process for generating a weighting factor, in accordance with an embodiment of the present invention.

FIG. 4 illustrates a flow chart of a process for generating a weighting factor, in accordance with an embodiment of the present invention. In one embodiment, process 400 is carried out by processors and electrical components (e.g., a computer system) under the control of computer readable and computer executable instructions, such as grencoder 110 of FIGS. 1 and 2. Although specific steps are disclosed in process 400, such steps are exemplary. That is, the embodiments of the present invention are well suited to performing various other steps or variations of the steps recited in FIG. 4.

At step 410 of process 400, a mean depth value for a macroblock is determined based on the depth values of the pixels of the macroblock. In MPEG terminology, a macroblock is a group of pixels that are 16 pixel by 16 pixel, and a 2D frame/picture is composed of non-overlapping macroblocks. In one embodiment, one coding mode for each macroblock (MB) of a group of N MBs are selected such that the total distortion is minimized subject to a rate constraint. For instance, the interdependencies of a row of MBs are modeled in video standard h.263 version 2 (h.263+) linearly, so that the rate and distortion of each $MB_i$, $R_i()$ and $D_i()$, depend only on mode $m_i$ of $MB_i$ and mode $m_{i-1}$ of previous $MB_{i-1}$, if available. As such, the mode selection problem can be formulated as the following optimization:

$$\min_{m_i \in M} \sum_{i=1}^{N} D_i(m_i, m_{i-1}) \; s.t. \; \sum_{i=1}^{N} R_i(m_i, m_{i-1}) \leq R_s, \quad (1)$$

where for h.263v2 the possible mode set $M$ for a predicted (P) frame is: $M=\{$INTRA, SKIP, INTER, INTER4$\}$, and $R_s$ is the bit rate constraint for the N MBs.

Instead of solving the original constrained problem, it is common practice to solve the corresponding Lagrangian or unconstrained problem as follows:

$$\min_{m_i \in M} \sum_{i=1}^{N} D_i(m_i, m_{i-1}) + \lambda_o R_i(m_i, m_{i-1}) \quad (2)$$

where $\lambda_o$ is the Lagrange multiplier of a given value. It can be easily shown that if there is a $\lambda$ such that the optimal solution $\{m_i^o\}$ to Equation 2 is such that $$\sum_{i=1}^{N} R_i(m_i^0) = R_s,$$

then $\{m_i^o\}$ is also the optimal solution to Equation 1. It has been shown that given the quantization parameter Q, the appropriate $\lambda$ can be found empirically. Given $\lambda$, Equation 2 is typically solved by marching through a trellis and finding the shortest path within it.

Given the available depth values d(j, k) of each pixel (i, k), the weight $w_i$ of each $MB_i$ can be computed, reflecting the level of interest for that MB. Given $w_i$'s, the following modified Lagrangian can be solved:

$$\min_{m_i \in M} \sum_{i=1}^{N} D_i(m_i, m_{i-1}) + \lambda(w_i) R_i(m_i, m_{i-1}) \quad (3)$$

where the multiplier $\lambda(w_i)$, controlling the severity of the penalty function $\lambda(w_i) R_i()$, now depends on the weight $w_i$ of $MB_i$. As described below, the pixel depth values d(j, k)'s are mapped to MB weight $w_i$'s, and the appropriate multiplier function $\lambda(w_i)$ is determined.

Given the depth value of each pixel (j, k), d(j, k), a weight $w_i$ for each 16×16 $MB_i$ is calculated to reflect the level of interest of $MB_i$. Anti-depth values are defined as the scalar difference of pixel depth from maximum depth value, e.g. $d_{max}$-d(j, k). In general, the surfaces of objects closer to the camera (e.g., large anti-depth values) are likely to garner more observer interest. Hence the mean of anti-depth values in a MB would be a good indicator of how close to the camera the surfaces of objects in the MB are likely to be. In fact, the square of the anti-depth value mean of pixels would be used to accentuate the importance of close-to-camera objects.

At step 420, a variance depth value for the macroblock is determined based on the depth values of the pixels. The edges of objects are often important as viewers try to discern the shape of objects. Edges of objects in a MB are often reflected in the variance of the pixel depth values.

Figure 5:
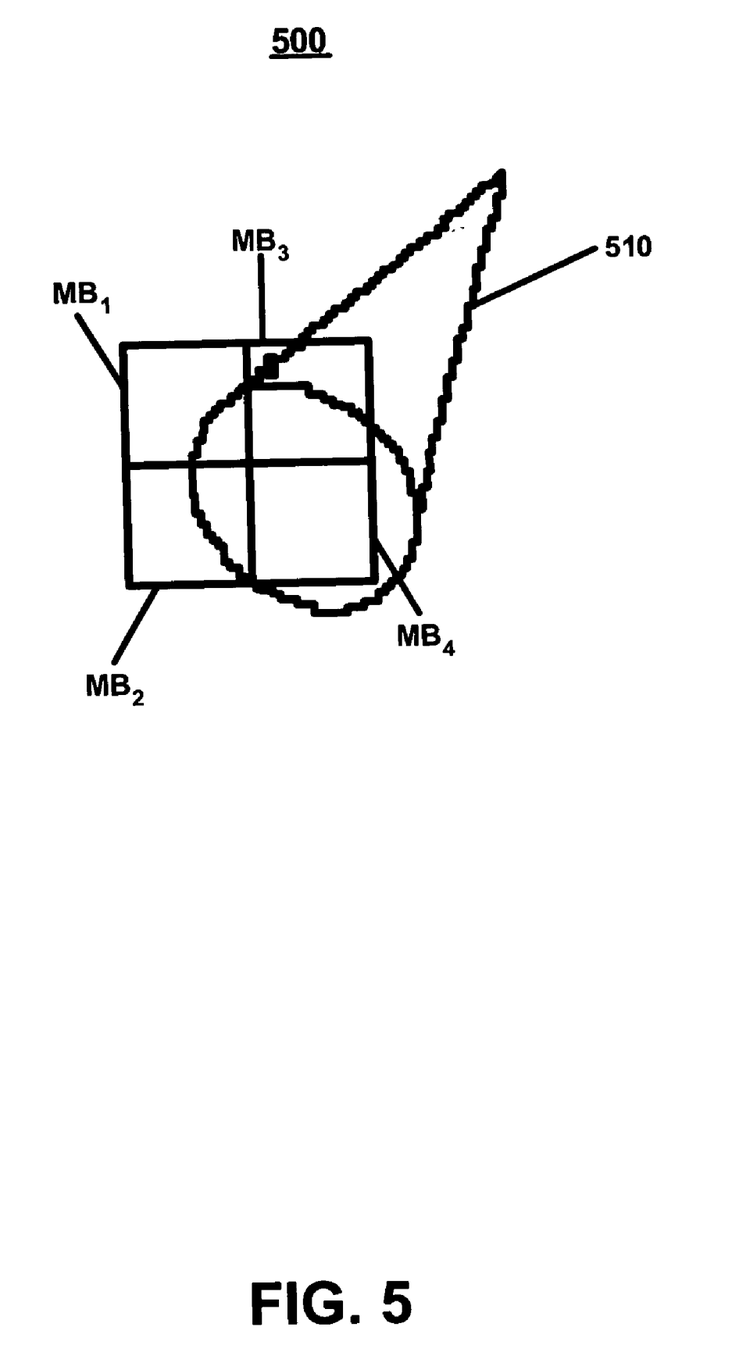
FIG. 5 illustrates an exemplary three-dimensional (3D) object projected onto a two-dimensional (2D) plane, in accordance with an embodiment of the present invention.

As an example, consider in FIG. 5 a cone object 510 whose bottom is closer to the camera than the top. FIG. 5 illustrates an exemplary 3D object 510 projected onto a 2D plane, in accordance with an embodiment of the present invention. $MB_3$ and $MB_4$ would have high anti-depth value mean, while $MB_1$ and $MB_2$ would have high variance of pixel depth values.

Given the two above considerations, the formula that $w_i$ equals to the square of the anti-depth value mean in $MB_i$ plus the variance of depth values in MB is used.

To control the extent to which more bits proportionally contribute to regions of interest at the expense of other MBs, $\gamma \geq 1$ is defined as the multiplicative factor such that no MB will receive more than $$\frac{\gamma}{N}$$

share of the bit budget. Furthermore, offset weights are defined as $v_i = w_i + w_{off}$, with $w_{off}$ being the offset parameter. On average $MB_i$ will receive $$\frac{v_i}{N\bar{v}}$$

portion of the bit budget, where $$\bar{v} = \frac{1}{N}\sum_{i=1}^{N} v_i$$

is the mean of the N MB offset weights. By definition of γ:

$$\frac{v_i}{N\bar{v}} \le \frac{\gamma}{N} \quad \forall_i \in \{1, \ldots, N\} \quad (4)$$

Inequality of Equation 4 is satisfied by defining offset parameter $w_{off}$ as:

$$w_{off} \stackrel{def}{=} \frac{w_{max} - \gamma \bar{w}}{\gamma - 1} \quad (5)$$

where $w_{max} = \max_{i=1,\ldots,N} \{w_i\}$ and $\bar{w} = \frac{1}{N}\sum_{i=1}^{N} w_i$.

Using this bit distribution strategy, the budget $R_s$ is perfectly exhausted to the N MBs:

$$\sum_{i=1}^{N} \frac{v_i}{N\bar{v}} R_s = \frac{R_s}{N\bar{v}} \sum_{i=1}^{N} w_i + w_{off} \quad (6)$$

$$= \frac{R_s}{N\bar{v}}(N\bar{w} + Nw_{off})$$

$$= R_s$$

At step 430, the weighting factor for a macroblock is generated based on the mean depth value and the variance depth value. The weighting factor may also be referred to as the multiplier function $\lambda(w_i)$.

Suppose $\lambda_o$ is selected a priori for original Lagrangian optimization of Equation 2 such that optimal solution $\{m_i^o\}$ has operational rate $$R_s^o = \sum_{i=1}^{N} R_i(m_i^o, m_{i-1}^o)$$

that is the same or very close to $R_s$ of original constrained optimization of Equation 1. The goal now is to, for each weight $w_i$ of $MB_i$, find multiplier $\lambda(w_1)$ that will result in usage of proportion $$\frac{v_i}{N\bar{v}}$$

of the bit budget $R_s$ when performing modified Lagrangian optimization of Equation 3. This means the solution $\{m_i^*\}$ to Equation 3 will result in operational rate $$R_s^* = \sum_{i=1}^{N} R_i(m_i^*, m_{i-1}^*) = R_s^o.$$

Having this requirement has the benefit that any previously derived formulas for k will have the same intended operational rate when our modified rate-distortion optimization is applied.

To derive the mappings $\lambda(w_i)$, a theoretical characterization of $\lambda$ and rate R is needed. The Lagrange multiplier $\lambda$ corresponds to the negative slope of the distortion-rate function:

$$\lambda = -\frac{dD}{dR} \quad (7)$$

A typical high-rate approximation curve for entropy-constrained scalar quantization can be written as:

$$R(D) = a\log\left(\frac{b}{D}\right) \quad (8)$$

where a and b are constants that parameterized the rate-distortion function. Hence $\lambda$ is related to R exponentially:

$$\lambda = \left(\frac{b}{a}\right) e^{-\frac{R}{a}} \quad (9)$$

One interpretation of Equation 9 is that to achieve operational rate $R_s^o$ for N MBs, the appropriate multiplier $\lambda_o$ is found by Equation 9. Parameters a and b and the intended rate $R_s^o$ remain to be solved. It is known that $$\lambda_o = \left(\frac{b}{a}\right) e^{-\frac{R_s^o}{a}}$$

results in bit consumption of $$\frac{1}{N} R_s^o$$

per MB on average for N MBs. To achieve target usage $$\frac{v_i}{N\bar{v}} R_s^o$$

for $MB_i$ then, a $\lambda(w_i)$ is found that will result in operational rate $$\frac{v_i}{\bar{v}} R_s^o$$

and apply it to $MB_i$ only as done in Equation 3, so that it will consume $$\frac{v_i}{N\bar{v}} R_s^o$$

on average.

To find $\lambda(w_i)$ that consumes $$\frac{v_i}{\bar{v}} R_s^o$$

bits for N MBs, $R_s^o$ is solved in terms of $\lambda_o$ and substitute in Equation 9:

$$\lambda(w_i) = \left(\frac{b}{a}\right)^{1-\frac{v_i}{v}} \lambda_o^{\frac{v_i}{v}} \quad (10)$$

$$\frac{b}{a} \geq \lambda_o$$

is know from observing Equation 9. If $$\frac{b}{a} \alpha \lambda_o,$$

where $\alpha \geq 1$, the following results:

$$\lambda(\omega_i) = \lambda_o \alpha^{1-\frac{v_i}{0}} = \lambda_o \alpha^{1-\left(\frac{\omega_i + \omega_{off}}{\overline{\omega} + \omega_{off}}\right)} \quad (11)$$

Returning to FIG. 3, at step 350, a bit stream is encoded based on the 2D frame and the composition information. In one embodiment, the bit stream is encoded utilizing a weighting factor (e.g., $\lambda(w_i)$) for macroblocks of the bit stream. In one embodiment, the bit stream is then streamed to interested game observers using mobile multicast support.

Various embodiments of the present invention provide a method and device for improved three-dimensional graphics to two-dimensional video encoding. The invention provides a method and device for streaming mobile network game sequences in standard compliant video to many game observers. The grencoder takes 3D game graphics as input, and increases the visual quality of regions of interest of the video by performing intelligent mode selection during h.263+ video encoding. The regions of interest are identified by extracting the composition information (e.g., depth values) of pixels in the frame buffer made available when 3D objects are projected to a 2D surface during rasterization.

Embodiments of the present invention, a method and device for three-dimensional graphics to two-dimensional video encoding, are thus described. While the present invention has been described in particular embodiments, it should be appreciated that the present invention should not be construed as limited by such embodiments, but rather construed according to the following claims.

What is claimed is:

1. A method for three-dimensional graphics to two-dimensional video encoding, said method comprising:
   receiving a three-dimensional model representing at least one three-dimensional object;
   rendering said three-dimensional model into a two-dimensional frame;
   extracting composition information for said two-dimensional frame from said three-dimensional model; and
   encoding a bit stream based on said two-dimensional frame and said composition information.

2. The method as recited in claim 1 further comprising generating a weighting factor based on said composition information, such that said bit stream is encoded utilizing said weighting factor.

3. The method as recited in claim 2 wherein said generating said weighting factor is applied on at least one macroblock of said two-dimensional frame for selecting encoding parameters.

4. The method as recited in claim 3 wherein said composition information includes depth information indicating depth values for pixels of said macroblock.

5. The method as recited in claim 4 wherein said generating said weighting factor comprises:
   determining a mean depth value for said macroblock based on said depth values of said pixels;
   determining a variance depth value for said macroblock based on said depth values of said pixels; and
   generating said weighting factor for said macroblock based on said mean depth value and said variance depth value.

6. The method as recited in claim 1 wherein said composition information includes motion information indicating motion vectors for pixels of said two-dimensional frame.

7. The method as recited in claim 1 wherein said composition information includes texture information indicating textures for pixels of said two-dimensional frame.

8. The method as recited in claim 2 further comprising transmitting said bit stream to a mobile client.

9. The method as recited in claim 8 wherein said mobile client is a personal digital assistant.

10. The method as recited in claim 8 wherein said mobile client is a cellular telephone.

11. A graphics-to-video encoder comprising:
   a graphics rendering unit for rendering a three-dimensional model into a two-dimensional frame;
   a composition information extractor coupled to said graphics rendering unit and for extracting composition information for said two-dimensional frame from said three-dimensional model; and
   a video encoder coupled to said graphics rendering unit and said composition information extractor and for encoding a bit stream based on said two-dimensional frame and said composition information.

12. The graphics-to-video encoder as recited in claim 11 wherein said composition information extractor is also for generating a weighting factor based on said composition information.

13. The graphics-to-video encoder as recited in claim 12 wherein said composition information extractor generates said weighting factor for at least one macroblock of said two-dimensional frame.

14. The graphics-to-video encoder as recited in claim 13 wherein said composition information includes depth information indicating depth values for pixels of said macroblock.

15. The graphics-to-video encoder as recited in claim 14 wherein said composition information extractor generates said weighting factor based on a mean depth value for said macroblock based on said depth values of said pixels and on a variance depth value for said macroblock based on said depth values of said pixels.

16. The graphics-to-video encoder as recited in claim 11 wherein said composition information includes motion information indicating motion vectors for pixels of said two-dimensional frame.

17. The graphics-to-video encoder as recited in claim 11 wherein said composition information includes texture information indicating textures for pixels of said two-dimensional frame.

18. The graphics-to-video encoder as recited in claim 11 wherein said bit stream is transmitted to a mobile client.

19. The graphics-to-video encoder as recited in claim 18 wherein said mobile client is a personal digital assistant.

20. The graphics-to-video encoder as recited in claim 18 wherein said mobile client is a cellular telephone.

21. A system for three-dimensional graphics to two-dimensional video encoding, said system comprising:
   a server for generating three-dimensional graphics;
   a graphics-to-video encoder comprising:
      a graphics rendering unit for rendering a three-dimensional model into a two-dimensional frame;
      a composition information extractor coupled to said graphics rendering unit and for extracting composition information for said two-dimensional frame from said three-dimensional model; and
      a video encoder coupled to said graphics rendering unit and said composition information extractor and for encoding a bit stream based on said two-dimensional frame and said composition information; and
   a mobile client for receiving said bit stream.

22. The system as recited in claim 21 wherein said composition information extractor is also for generating a weighting factor based on said composition information.

23. The system as recited in claim 22 wherein said composition information extractor generates said weighting factor for at least one macroblock of said two-dimensional frame.

24. The system as recited in claim 23 wherein said composition information includes depth information indicating depth values for pixels of said macroblock.

25. The system as recited in claim 24 wherein said composition information extractor generates said weighting factor based on a mean depth value for said macroblock based on said depth values of said pixels and on a variance depth value for said macroblock based on said depth values of said pixels.

26. The system as recited in claim 21 wherein said composition information includes motion information indicating motion vectors for pixels of said two-dimensional frame.

27. The system as recited in claim 21 wherein said composition information includes texture information indicating textures for pixels of said two-dimensional frame.

28. The system as recited in claim 21 wherein said mobile client is a personal digital assistant.

29. The system as recited in claim 21 wherein said mobile client is a cellular telephone.

30. The system as recited in claim 21 wherein said server is a game server.

31. A computer-readable medium having computer-readable program code embodied therein for causing a computer system to perform a method for three-dimensional graphics to two-dimensional video encoding, said method comprising:
   receiving a three-dimensional model representing at least one three-dimensional object;
   rendering said three-dimensional model into a two-dimensional frame;
   extracting composition information for said two-dimensional frame from said three-dimensional model; and
   encoding a bit stream based on said two-dimensional frame and said composition information.

32. The computer-readable medium as recited in claim 31 further comprising generating a weighting factor based on said composition information, such that said bit stream is encoded utilizing said weighting factor.

33. The computer-readable medium as recited in claim 32 wherein said generating said weighting factor is applied on at least one macroblock of said two-dimensional frame for selecting encoding parameters.

34. The computer-readable medium as recited in claim 33 wherein said composition information includes depth information indicating depth values for pixels of said macroblock.

35. The computer-readable medium as recited in claim 34 wherein said generating said weighting factor comprises:
   determining a mean depth value for said macroblock based on said depth values of said pixels;
   determining a variance depth value for said macroblock based on said depth values of said pixels; and
   generating said weighting factor for said macroblock based on said mean depth value and said variance depth value.

36. The computer-readable medium as recited in claim 31 wherein said composition information includes motion information indicating motion vectors for pixels of said two-dimensional frame.

37. The computer-readable medium as recited in claim 31 wherein said composition information includes texture information indicating textures for pixels of said two-dimensional frame.

38. The computer-readable medium as recited in claim 32 further comprising transmitting said bit stream to a mobile client.

39. The computer-readable medium as recited in claim 38 wherein said mobile client is a personal digital assistant.

40. The computer-readable medium as recited in claim 38 wherein said mobile client is a cellular telephone.

* * * * *

UNITED STATES PATENT AND TRADEMARK OFFICE
CERTIFICATE OF CORRECTION

PATENT NO. : 7,426,304 B2  
APPLICATION NO. : 10/942357  
DATED : September 16, 2008  
INVENTOR(S) : Gene Cheung et al.

It is certified that error appears in the above-identified patent and that said Letters Patent is hereby corrected as shown below:

In column 5, line 33, delete "$MB_i$." and insert -- $MB_{i-1}$ --, therefor.

In column 5, line 43, delete "$set^M$" and insert -- $set\ ^M$ --, therefor.

In column 6, line 4, delete "(i,k)" and insert -- (j,k) --, therefor.

In column 7, line 47, delete "$\lambda(w_1)$" and insert -- $\lambda(w_i)$ --, therefor.

In column 7, line 65, delete "k" and insert -- $\lambda$ --, therefor.

Signed and Sealed this

Eighth Day of September, 2009

David J. Kappos  
*Director of the United States Patent and Trademark Office*